(12) United States Patent
Park et al.

(10) Patent No.: US 6,991,399 B2
(45) Date of Patent: Jan. 31, 2006

(54) STEEL BEAM COUPLING DEVICE

(76) Inventors: Jong-Won Park, 405-902, Expo Apt., Jonmin-dong, Yusong-Ku, Taejon (KR) 305-762; In-Kyu Hwang, 1009, Boyoung Apt., Seopyung-ri, Kangwoi-myun, Chongwon-kun, Chungbuk (KR) 363-953

( * ) Notice: Subject to any disclaimer, the term of this patent is extended or adjusted under 35 U.S.C. 154(b) by 0 days.

(21) Appl. No.: 10/297,286

(22) PCT Filed: Apr. 4, 2001

(86) PCT No.: PCT/KR01/00572

§ 371 (c)(1),
(2), (4) Date: Dec. 4, 2002

(87) PCT Pub. No.: WO01/96752

PCT Pub. Date: Dec. 20, 2001

(65) Prior Publication Data

US 2003/0129026 A1    Jul. 10, 2003

(30) Foreign Application Priority Data

Jun. 13, 2000    (KR) ............................... 2000-32359

(51) Int. Cl.
*B25G 3/28*    (2006.01)
(52) U.S. Cl. ...................... 403/355; 403/187; 403/230; 403/256; 403/315; 403/319; 403/374.1; 403/409.1

(58) Field of Classification Search ............ 248/228.2, 248/231.31; 52/653.1, 655.1; 403/187, 403/188, 205, 230, 231, 232.1, 247, 256, 403/257, 263, 286, 315, 319, 331, 355, 373, 403/374.1, 375, 382, 403, 409.1
See application file for complete search history.

(56) References Cited

U.S. PATENT DOCUMENTS

| | | | | |
|---|---|---|---|---|
| 2,562,483 A | * | 7/1951 | Bender | 403/247 |
| 2,627,431 A | * | 2/1953 | Sechrist | 403/355 |
| 3,685,866 A | * | 8/1972 | Patenaude | 403/189 |
| 3,734,549 A | * | 5/1973 | Loov | 403/75 |
| 3,938,297 A | * | 2/1976 | Sato et al. | 403/188 |
| 5,061,111 A | * | 10/1991 | Hosokawa | 403/232.1 |

* cited by examiner

*Primary Examiner*—Daniel P. Stodola
*Assistant Examiner*—Michael P. Ferguson
(74) *Attorney, Agent, or Firm*—Staas & Halsey LLP

(57) ABSTRACT

A coupling device for connecting members, including: a coupling case that has a plurality of connecting slots which respectively receive the members; and wedges that are inserted into the spaces between the coupling case and each of the members perpendicularly to the direction of external pressure given to each of the members. Each of the wedges have one side and another side out of at least a couple of slope sides contacting the coupling case in opposite directions and have a higher coefficient of friction on a bottom side surface that touches one of the members than on the slope side surface that touches the coupling case.

4 Claims, 23 Drawing Sheets

STEEL BEAM COUPLING DEVICE

TECHNICAL FIELD

The present invention relates to a coupling device for structural members to transfer load from one member to another. The coupling device comprises a coupling case that contains connecting slots in which the members to be connected are placed and wedges that are inserted in the space between the coupling case and the connected members. The coupling device of the present invention can connect structural members using the wedging action under external forces. To prevent the members from slipping out of the coupling case, the surface of the wedge that touches the connected member is treated to have a higher coefficient of friction than the surface that touches the coupling case.

BACKGROUND ART

Bolt connection has been widely used as the means of structural connection in construction fields. As illustrated in FIG. 1, bolt connection connects two members (10) by inserting bolts (14) into the holes in the members and the splice plates (12) and tightening the nuts (15).

However, bolt connection requires a large number of holes to be drilled in the connected members and the splice plates, and this causes problems such as a notch or stress concentration around the holes.

Furthermore, since the holes are drilled larger than the bolt diameter to meet the dimensional tolerance during erection, slip of the connection may occur and result in undesirable performance when the joint is subjected to repeated reversed load as shown in FIG. 2. In order to prevent slip from occurring, friction-type connection has been used. In the friction-type connection, high clamping force is induced by tightening the nuts sufficiently and the connection resists load by the friction force between the connected member and the splice plates. However, the specified pretension force is not easy to obtain and installation of bolts increases the construction costs.

To improve the performance of bolt connection, Korean Laid-open Pat. No. 1999-76051 (Application No. 10-1998-10689) has disclosed a connecting technique in which friction rings (16) are placed between the connected member (10) and the splice plates (12) to increase the frictional force (See FIG. 3). Likewise, Korean Laid-open Pat. No. 1998-72021 (Application No. 10-1998-28349) has disclosed another connecting technique in which the surfaces of connected member (10) and the splice plates (12) are treated to have serrations to increase the frictional force (See FIG. 4).

The proposed methods may increase the frictional force but can not solve the problems of bolted connection. Moreover, friction rings make a gap between the connected member and the splice plates, which may impair the integrity of the joint. Mechanically processing the surfaces to have serrations may increase the fabrication costs.

DISCLOSURE OF INVENTION

It is the objective of the present invention to provide an economical coupling device for structural connections that is easy to install and has a good structural performance.

The coupling device of the present invention can solve the problems of the bolt connection by reducing or excluding the use of bolts using wedging action.

The coupling device of the present invention has characteristics described hereinafter.

The coupling device comprises a coupling case that contains connecting slots in which the members to be connected are placed and wedges that are inserted into the space between the coupling case and the connected members.

In addition, the surface of said wedge which touches said member is treated to have a higher coefficient of friction than the surface which touches said coupling case.

The sectional shape of said wedge could be selected among triangle, trapezoid, and pentagon to conform in shape to the space between said coupling case and said members.

Said wedge has a feature that the angle (θ) between the slope side and the bottom side is ranged from 1° to $$\left(\mathrm{atan}\frac{\mu' - \mu}{1 + \mu \cdot \mu'}\right)$$

(where $\mu$ is a coefficient of friction between said wedge and said coupling case, and $\mu'$ is a coefficient of friction between said wedge and said members).

The bottom surface of said wedge has a feature that it is treated to increase the coefficient of friction. Particularly, said bottom surface may be processed mechanically to have serrations of various shapes.

Contrary, the slope surface of said wedge has a feature that it is treated to reduce the coefficient of friction. Precisely, said slope surface may be finished mechanically and/or coated with a lubricant.

If said coupling case is a separate-type, it has a feature that the two parts are joined using bolts or using male piece having projection part (herein after male piece) and female piece having furrow part (herein after female piece). In the latter case, a male piece slips into a female guide (the male and female pieces can be tapered to help installation).

As depicted in FIG. 6, an elastic clipping plate can be used for joining said wedge and said member in firm contact. Springs, screws, and the like can be used for the same purpose.

The coupling device of the present invention will be clearly described in reference to the following drawings hereinafter. However, these drawings are for illustration purpose, and modification and improvement can be made in the scope of the present invention.

FIG. 5 illustrates the principle of operation for the coupling device of the present invention.

In FIG. 5, θ is the angle between the bottom side (304) and the slope side (302) of the wedge; $\mu$ is the coefficient of friction between the slope surface of the wedge (302) and the coupling case (20); $\mu'$ is the coefficient of friction between the bottom surface of the wedge (304) and the connected member (10); P' is the externally applied load acting on the connected member (10); P is the vertical force induced by P' due to the wedging action (P increases proportionally as P' increases).

Force equilibrium along the slope side of the wedge requires $$2\left(\frac{P'}{2}\cos\theta\right) - 2P\sin\theta = 2\mu\left(\frac{P'}{2}\sin\theta + P\cos\theta\right) \qquad (1)$$

where $$\frac{P'}{2}\cos\theta$$

is the component of force P' in the slope direction; Psinθ is the component of force P in the slope direction;

$$\mu\left(\frac{P'}{2}\sin\theta + P\cos\theta\right)$$

is the frictional force along the slope surface.

Solving Equation (1) for P' gives $$P' = 2P\frac{\sin\theta + \mu\cos\theta}{\cos\theta - \mu\sin\theta} \quad (2)$$

In order to prevent the connected member from slipping out of the coupling case, the frictional resistance acting on the contact area between the bottom surface of the wedge (304) and the connected member (10) is required to exceed the external load. This requirement may be written as P'<2Pμ'.

Using Equation (2), this requirement becomes $$\frac{\sin\theta + \mu\cos\theta}{\cos\theta - \mu\sin\theta} < \mu' \quad (3)$$

Solving Equation (3) for θ gives $$\theta < \operatorname{atan}\frac{\mu' - \mu}{1 + \mu \cdot \mu'} \quad (4)$$

Consequently, the angle θ is calculated by substituting μ and μ' values into the equation (4) and then the shape of the wedge (10) is determined to have a lower value than the calculated θ considering the safety factor for the structure.

Namely, when external forces such as tension, compression and shearing force are acted on the member (10), as the external force increases, the vertical force that is induced to the member (10) by the wedge (30) increases due to the difference between the coefficient of friction μ between the slope side (302) of the wedge (30) and the coupling case (20) and μ' between the bottom side (304) of the wedge (30) and the member (10). As a result, the frictional force between the member (10) and the wedge (30) depends on the maximum capacity of said coupling case (20) to resist the vertical force.

The size and the shape of the wedge (30) is determined depending on the value of θ. As the difference in the values of the friction coefficients μ and μ' increases, the larger value of the angle θ can be used. As the value of θ increases, the force that the coupling case has to resist in vertical direction reduces, which helps to reduce the size of the coupling case. This is why the μ value of the slope surface (302) of the wedge (30) needs to be reduced by finishing mechanically or coating with lubricants. At the same time, the μ' value needs to be increased by mechanically processing the bottom surface (304) of the wedge (30) to have serrations of various shapes. The examples of the serrations are demonstrated in FIG. 8.

In the specification of the present invention, the term "member (10)" is used to represent the members to be connected such as structural steel H-shaped sections. However, It can be made of any material such as wood, plastic, and stone. Likewise, the coupling case (20) and the wedge (30) can be made of steel preferably, but also of any material such as wood, plastic, stone, and so on.

The term "connecting slot (22)" designates the slots made in the coupling case (20) where the member (10) and the wedge (30) are placed for connection. The term "connecting slot (22)" is described and indicated hereafter without the symbol of the figure FIG. 6 shows the installation of the coupling device of the present invention when external force P acts in the direction shown in the figure. The upper one is an illustration of the dismantled state and the lower one is an illustration of the assembled state.

As demonstrated in FIG. 6, when two members (10) are connected in order to resist force P that acts in the direction shown in the figure, the coupling case (20) is incorporated between two members (10). After the members are placed in the connecting slots of coupling case (20) (the symbol of the figure not denoted), wedges (30) are inserted into the space between the coupling case and the members in the direction that is perpendicular to the direction of the external force. To join the wedge and the member in firm contact, an elastic clipping plate (40) can be used as shown in FIG. 6. Elastic clipping plates are not shown but can be used in other figures.

The wedges (30) are made to have a proper angle between the slope side and the bottom side, which is determined from Equation (4). In the assembled state, the members (10) do not slip out of the coupling case (20) under external force P acting in the direction shown in the figure due to the wedging action of the wedge (30). As the external force increases, the higher clamping force is induced in the vertical direction and the frictional force increases proportionally.

FIG. 7 shows the installation of the coupling device according to the present invention when external force P acts in the direction shown in the figure. The upper one is an illustration of the dismantled state and the lower one is an illustration of the assembled state.

As demonstrated in FIG. 7, when two members (10) are connected in order to resist force P that acts in the direction shown in the figure, the coupling case (20) is incorporated between two members (10). After the members are placed in the connecting slots of coupling case (20) (the symbol of the figure not denoted), wedges (30) are inserted into the space between the coupling case and the members (10) in the direction that is perpendicular to the direction of the external force.

The wedges (30) are made to have a proper angle between the slope side and the bottom side, which is determined from Equation (4). In the assembled state, the members (10) do not slip out of the coupling case (20) under external force P acting in the direction shown in the figure due to the wedging action of the wedge (30). As the external force increases, the higher clamping force is induced in the vertical direction and the frictional force increases proportionally.

FIG. 8 shows the appearance of the bottom surface of the wedge of the present invention.

As illustrated in FIG. 8, the bottom surface of the wedge (30) can be mechanically processed with various techniques in order to increase the coefficient of friction. Though serrations of projection type (306) and furrow type (308) are shown in the figure, different kinds of shapes can be used.

FIG. 9 illustrates the shapes of the wedge in the present invention.

As described in FIG. 9, the wedge (30) can be formed in various shapes. Though triangle (31), pentagon (32), trapezoid (35), double pentagon (36), and the like are shown in the figure, different shapes can be used.

The wedge of No. 38 can be used in the case when the coupling device is designed to transfer external force applied monotonically. The wedge of No. 39 has a slope in the axial direction of the wedge in order to help installation.

Wedges of a pentagon shape are used to illustrate the present invention. However, the scope of the present invention is not limited to this shape.

Although it is desirable to conform the slope of the connecting slot to that of the wedge (30), different shape can be used depending on conditions.

FIG. 10 shows the installation of the separate-type coupling case according to the present invention. The upper one is an illustration of the dismantled state and the lower one is an illustration of the assembled state. The coupling case (20) is made in two pieces, which are joined using bolts (14). This separate-type coupling case (20) can be used when one-body type is inconvenient to use.

FIG. 11 illustrates another separate-type coupling case different from that of FIG. 10. The two pieces of the coupling case (20) are joined by sliding the male piece into the female piece using connecting fragment (310). The male piece and the female piece can be tapered to help installation.

FIG. 12 illustrates the coupling case of the present invention, which can resist external forces acting in two directions perpendicular to each other.

As described in FIG. 12, this coupling case (20) has connecting slots in which wedges are placed in two directions perpendicular to each other to prevent the members from slipping out of the coupling case in either direction. Each wedge resists external force applied in the direction perpendicular to the direction of the wedge.

EXPLANATION OF SYMBOLS IN THE FIGURES

Figure 1:
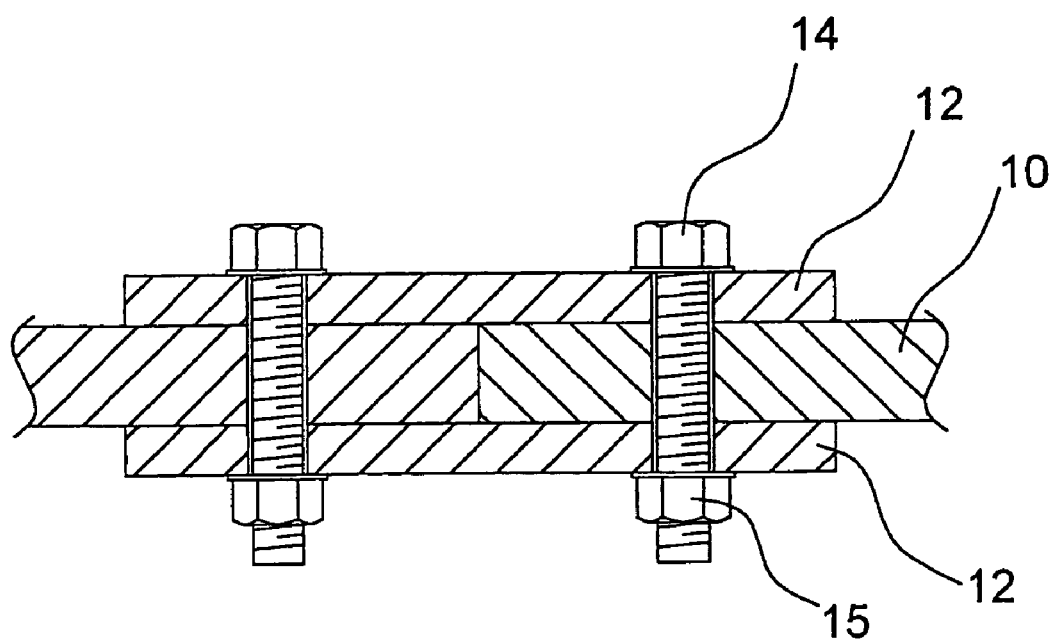
FIG. 1 represents the method 1 of the prior art.
Figure 2:
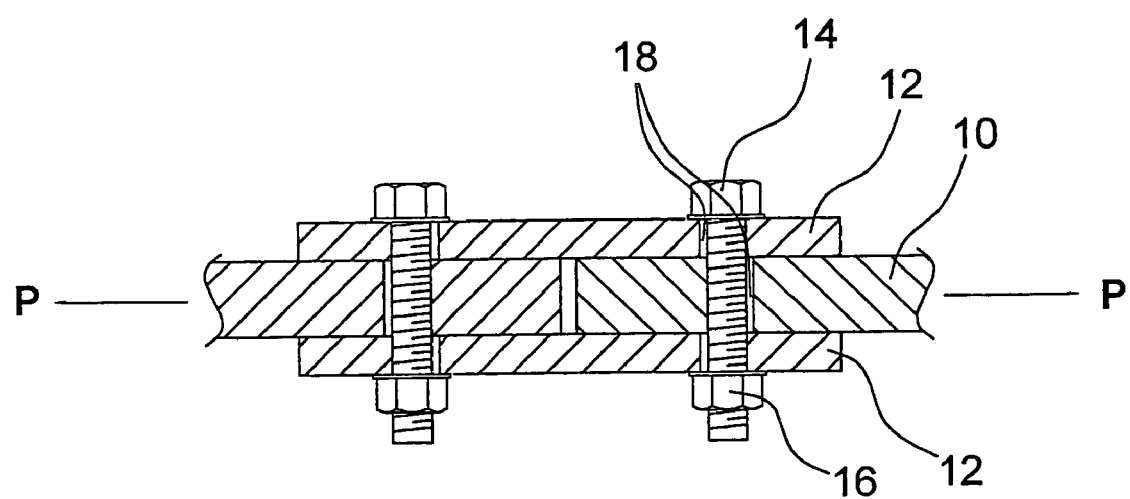
FIG. 2 represents the problems of the method 1 of the prior art.
Figure 3:
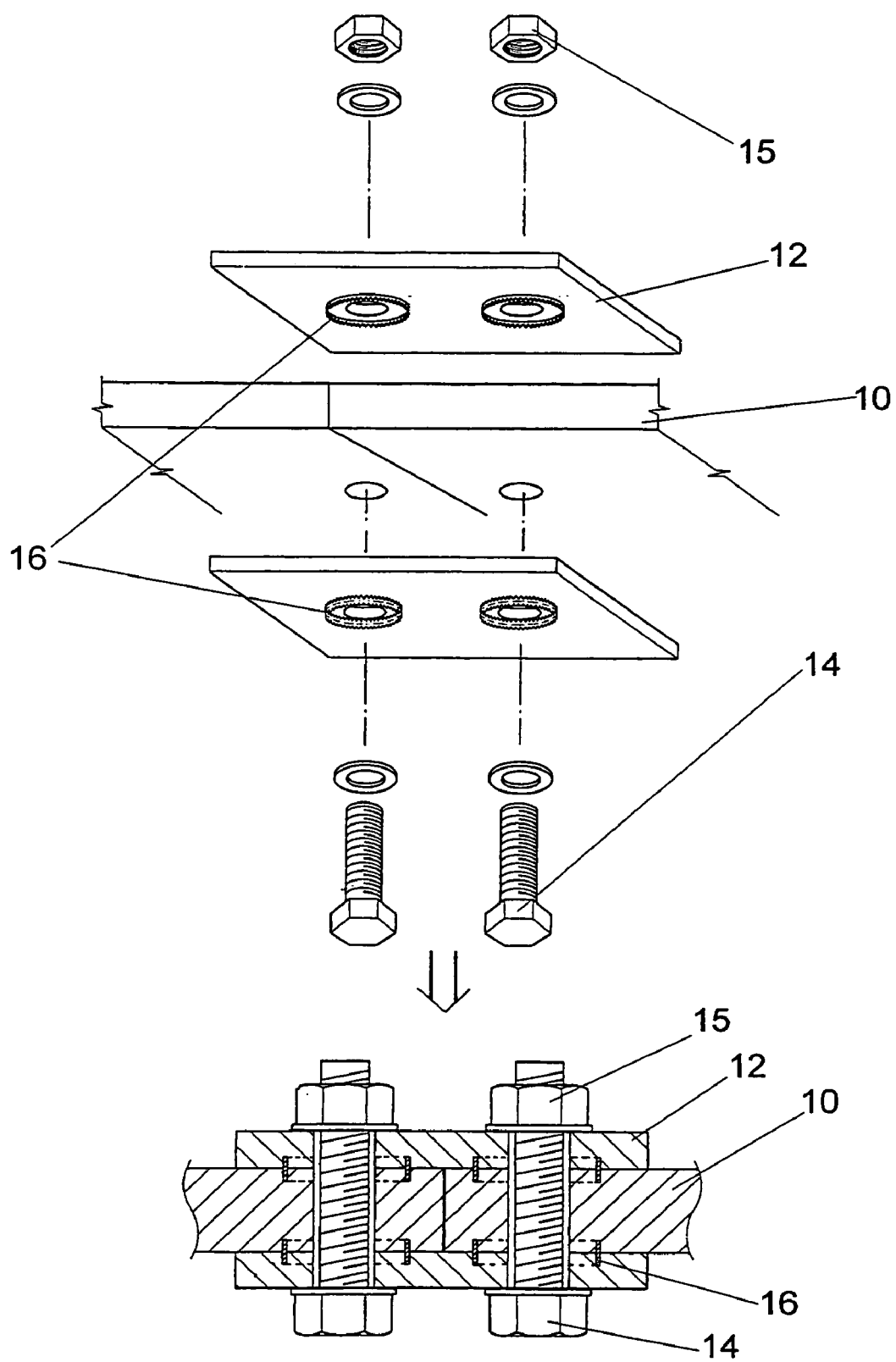
FIG. 3 represents the method 2 of the prior art.
Figure 4A:
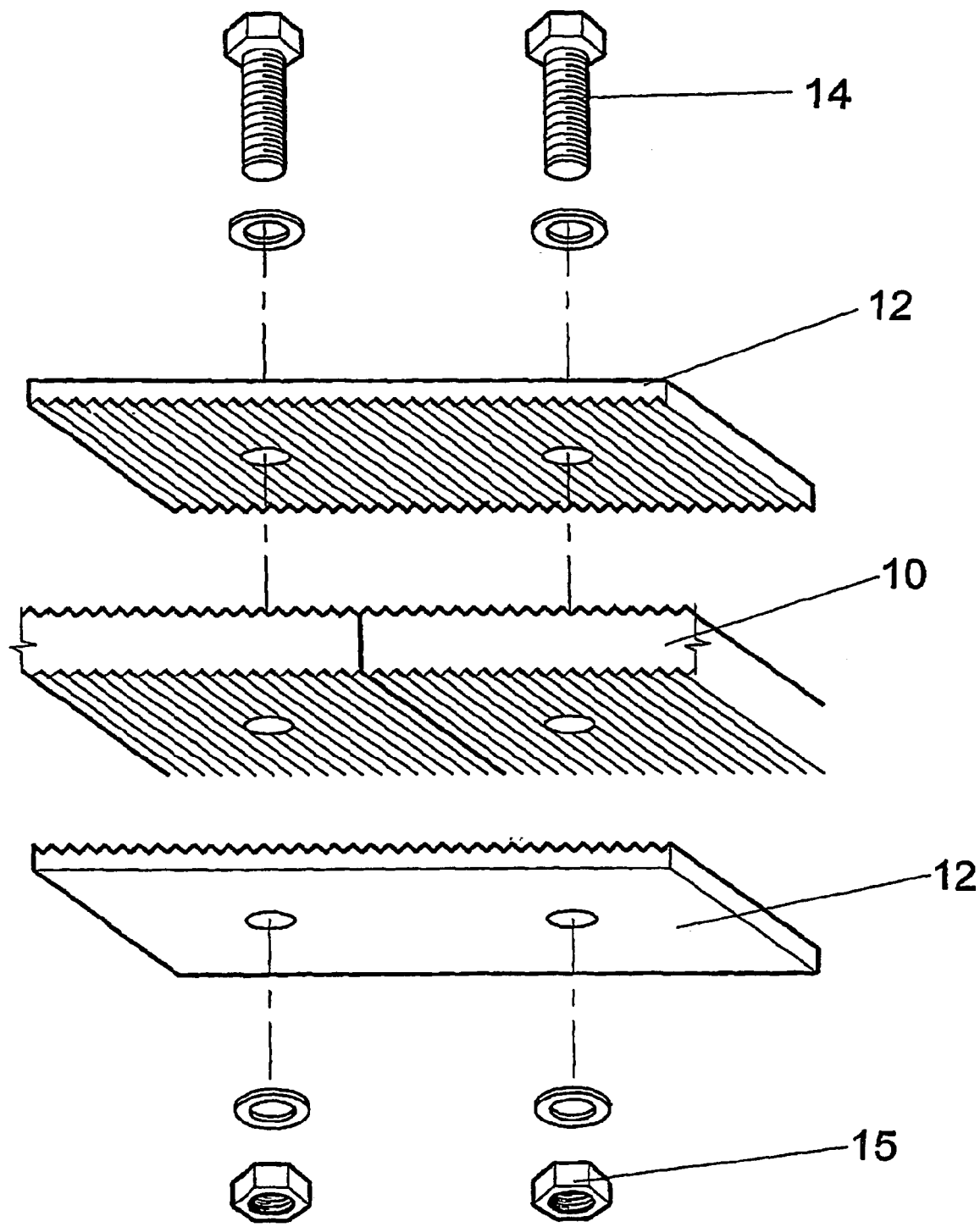
FIGS. 4A and 4B represent the method 3 of the prior art.
Figure 4B:
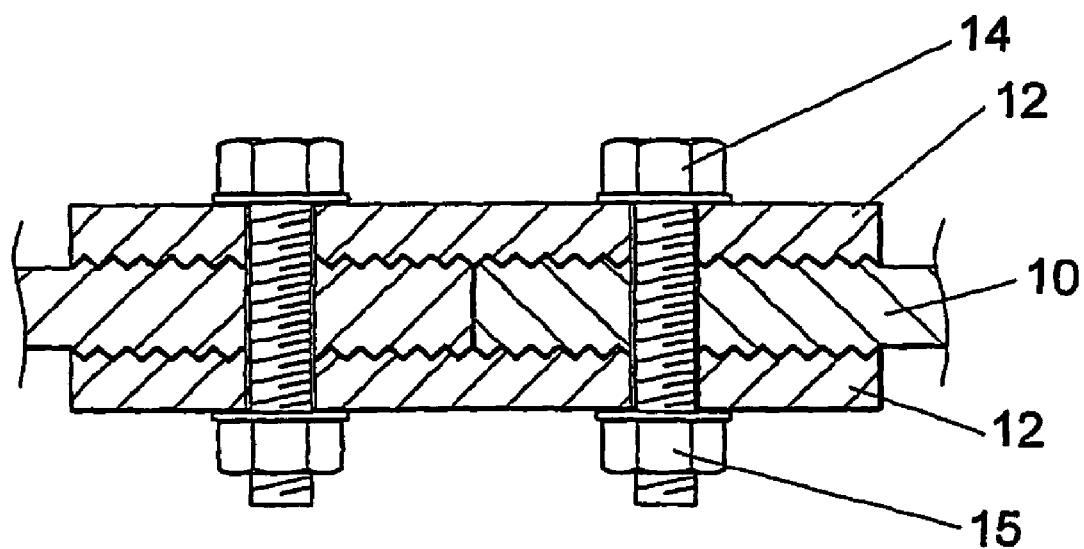
Figure 5A:
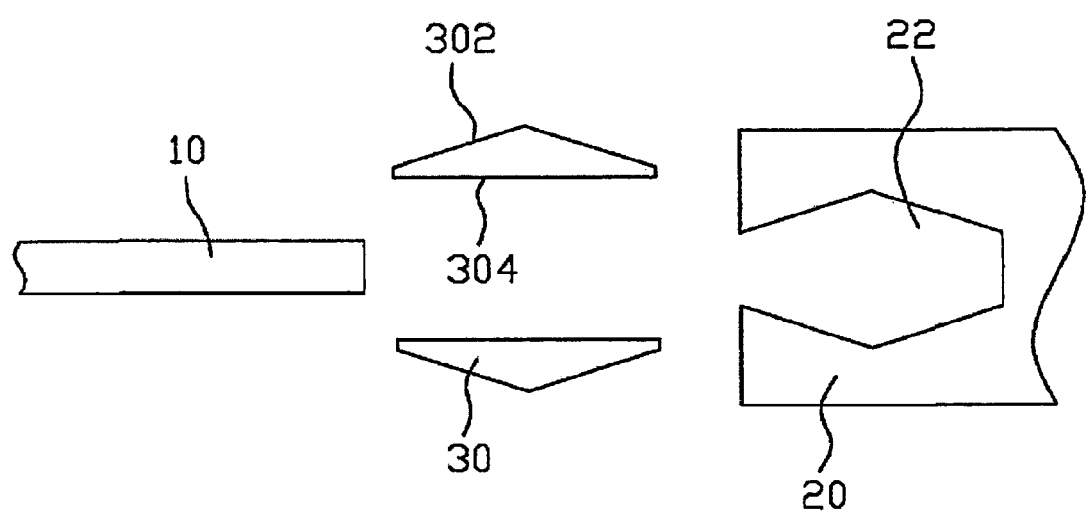
FIGS. 5A and 5B illustrate the principle of operation according to the present invention.
Figure 5B:
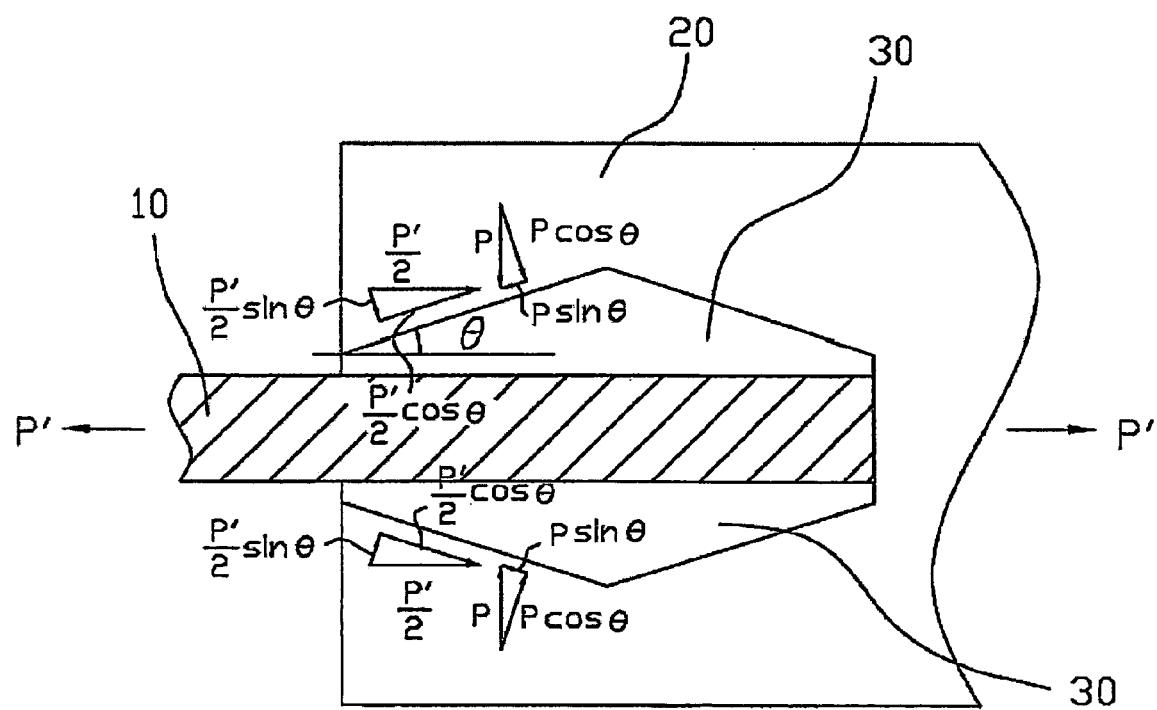

10: member
20: coupling case
30: wedge
306: projection
308: serration
40: elastic clipping plate

BEST MODE FOR CARRYING OUT THE INVENTION

Practical and presently preferred embodiments of the present invention are illustrative as shown below.

However, it will be appreciated that those skilled in the art, on consideration of this disclosure, may make modifications and improvements within the scope of the present invention.

<Preferred Embodiment 1>

Figure 6A:
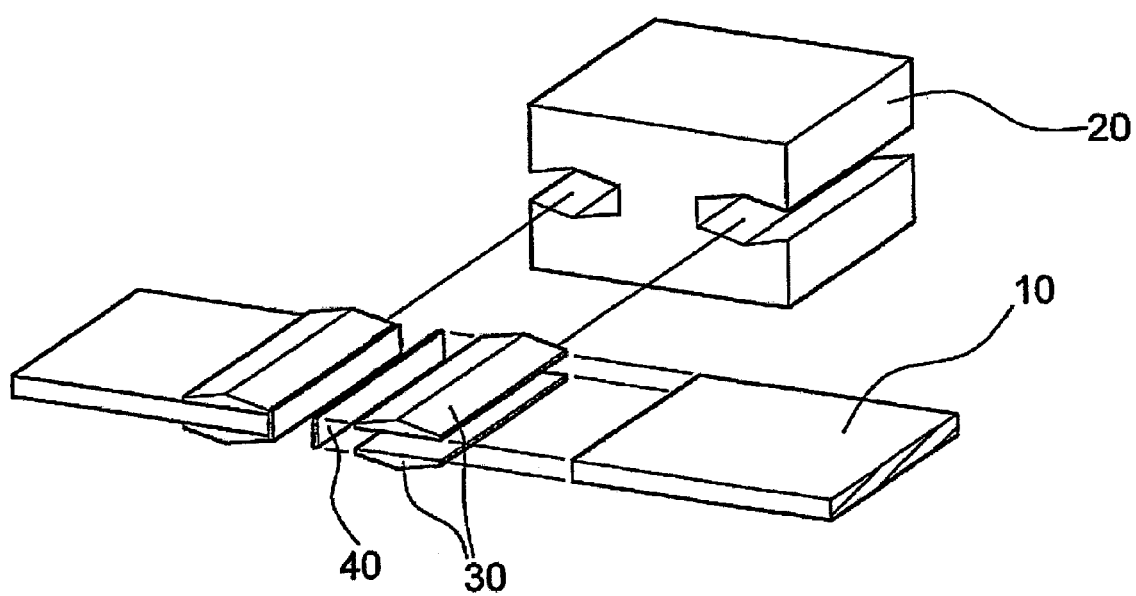
FIGS. 6A and 6B show the coupling device of the present invention for connecting members subjected to axial compression and/or tension force.
Figure 6B:
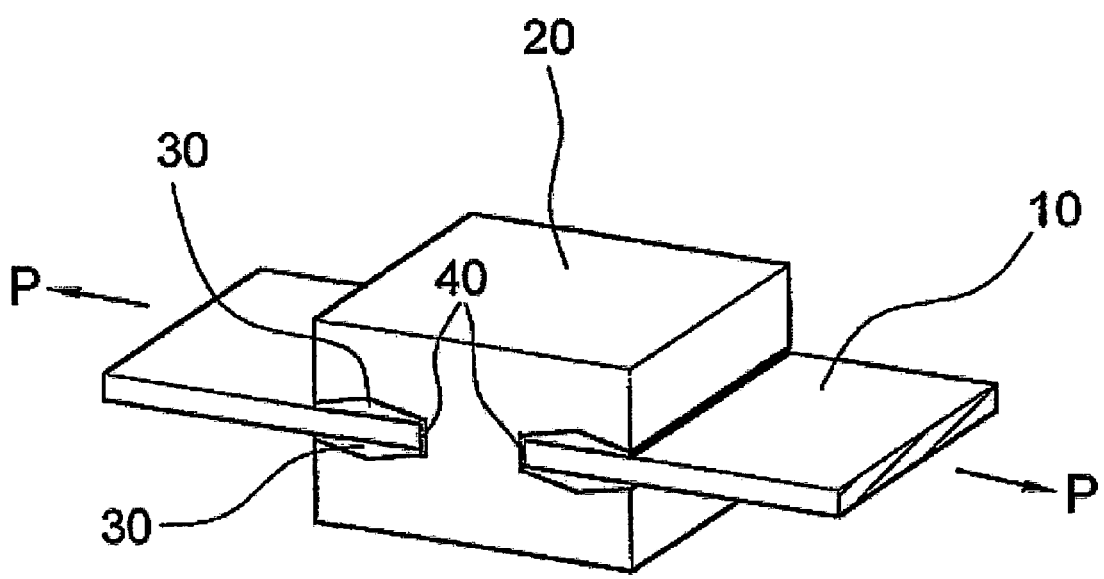
Figure 7A:
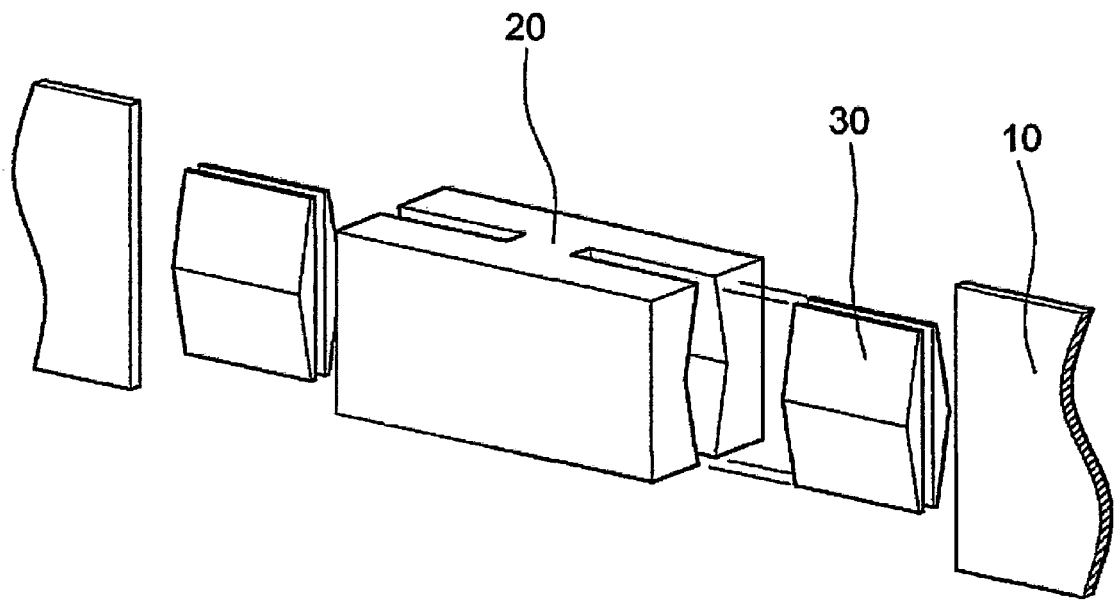
FIGS. 7A and 7B show the coupling device of the present invention for connecting members subjected to shear force.
Figure 7B:
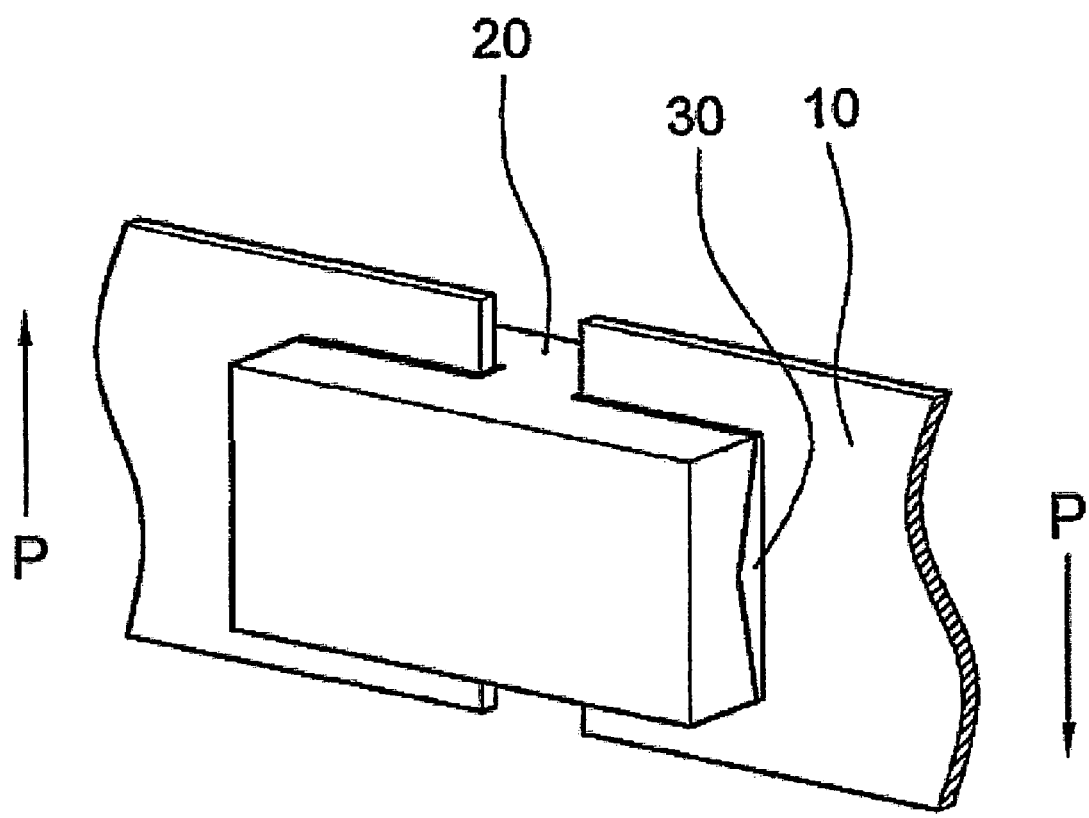
Figure 8:
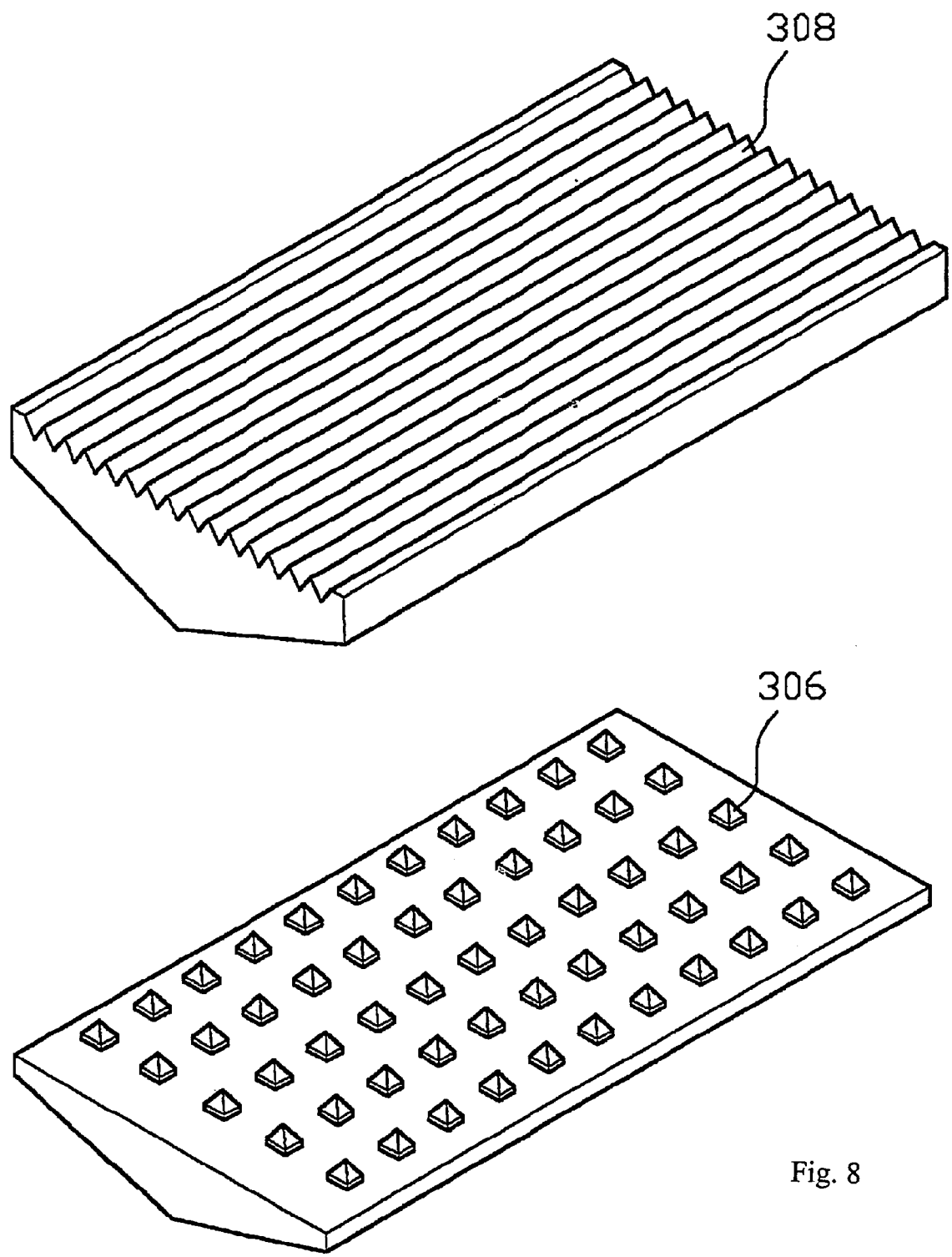
FIG. 8 illustrates the bottom surface of the wedge according to the present invention.
Figure 9:
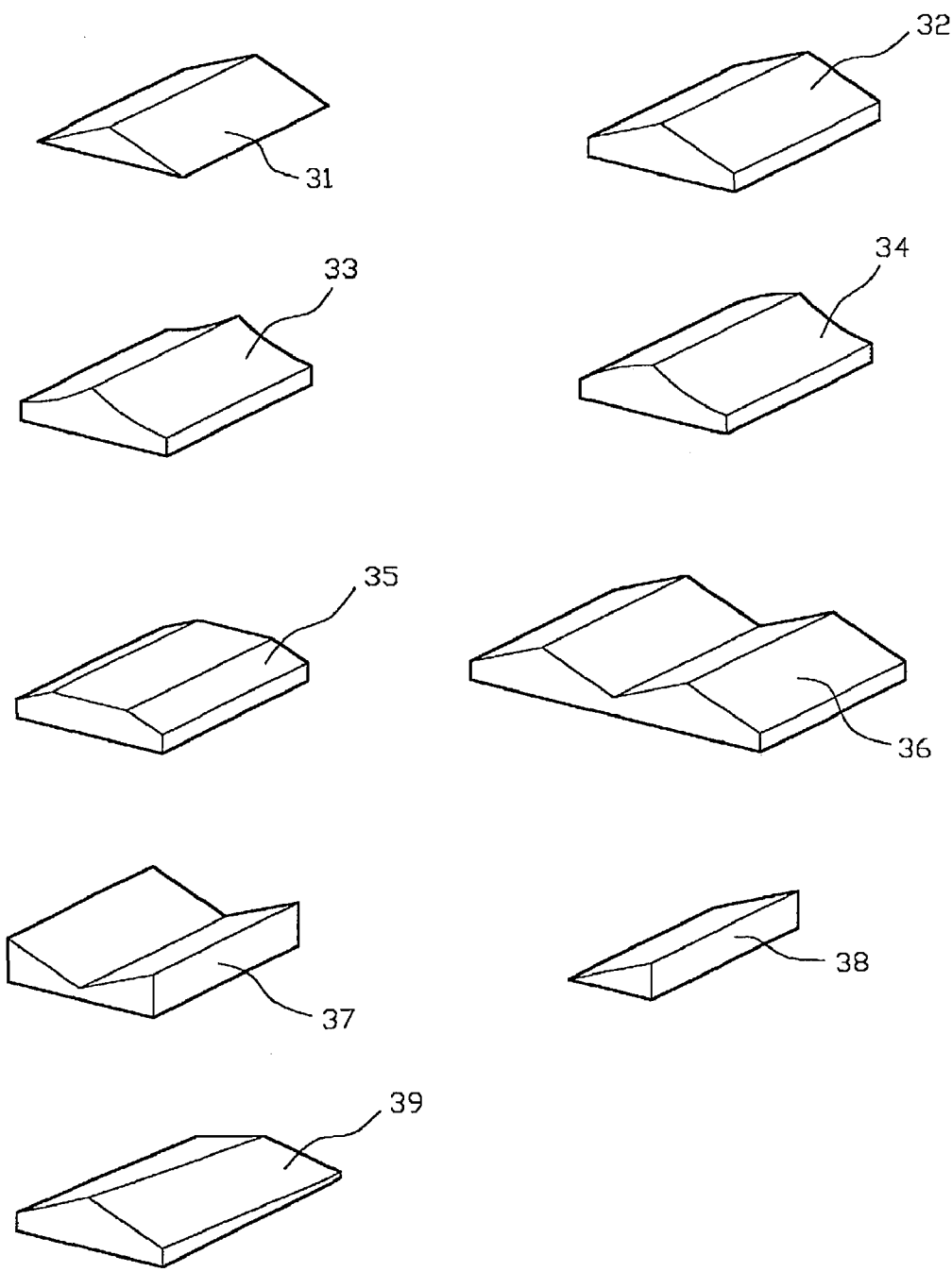
FIG. 9 illustrates various shapes of the wedge according to present invention.
Figure 10A:
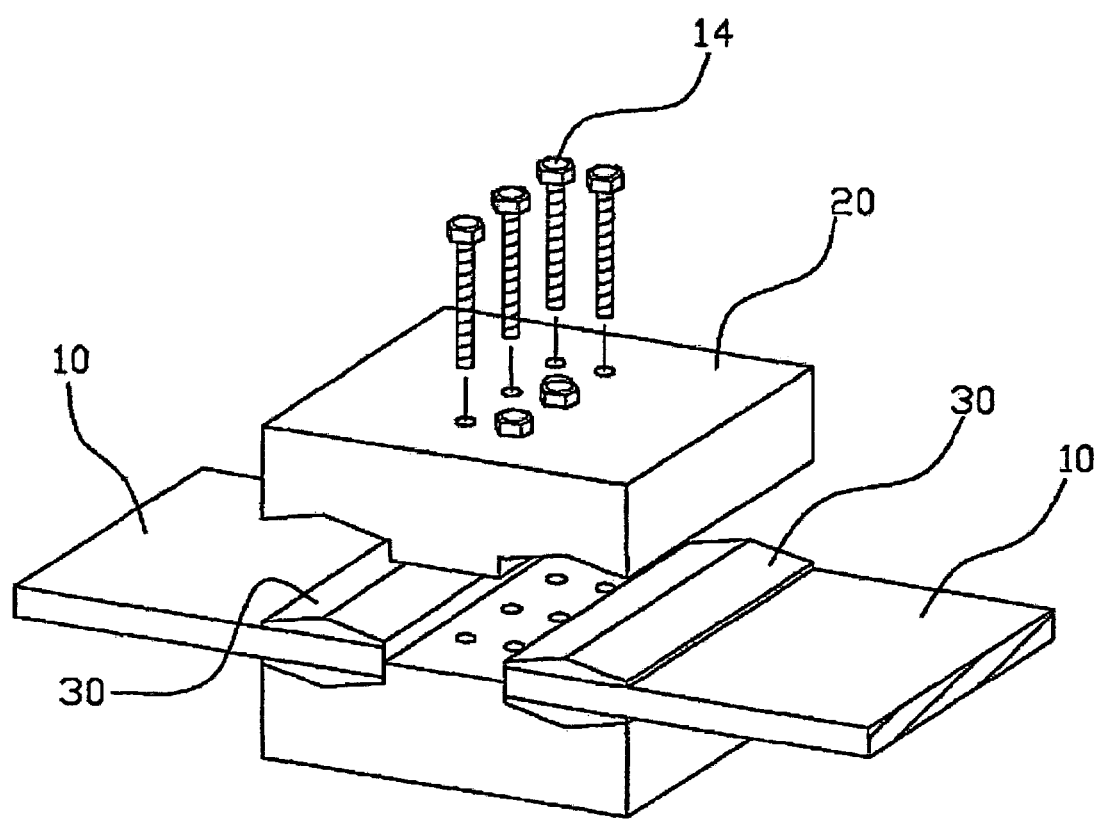
FIGS. 10A and 10B show the separate-type coupling case of the present invention using bolts.
Figure 10B:
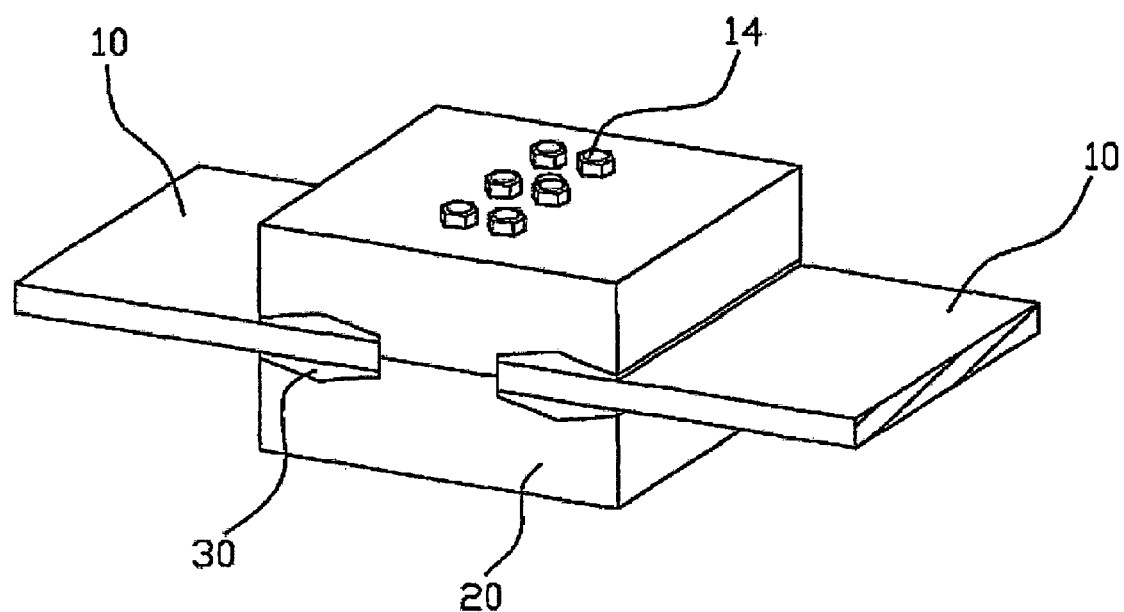
Figure 13:
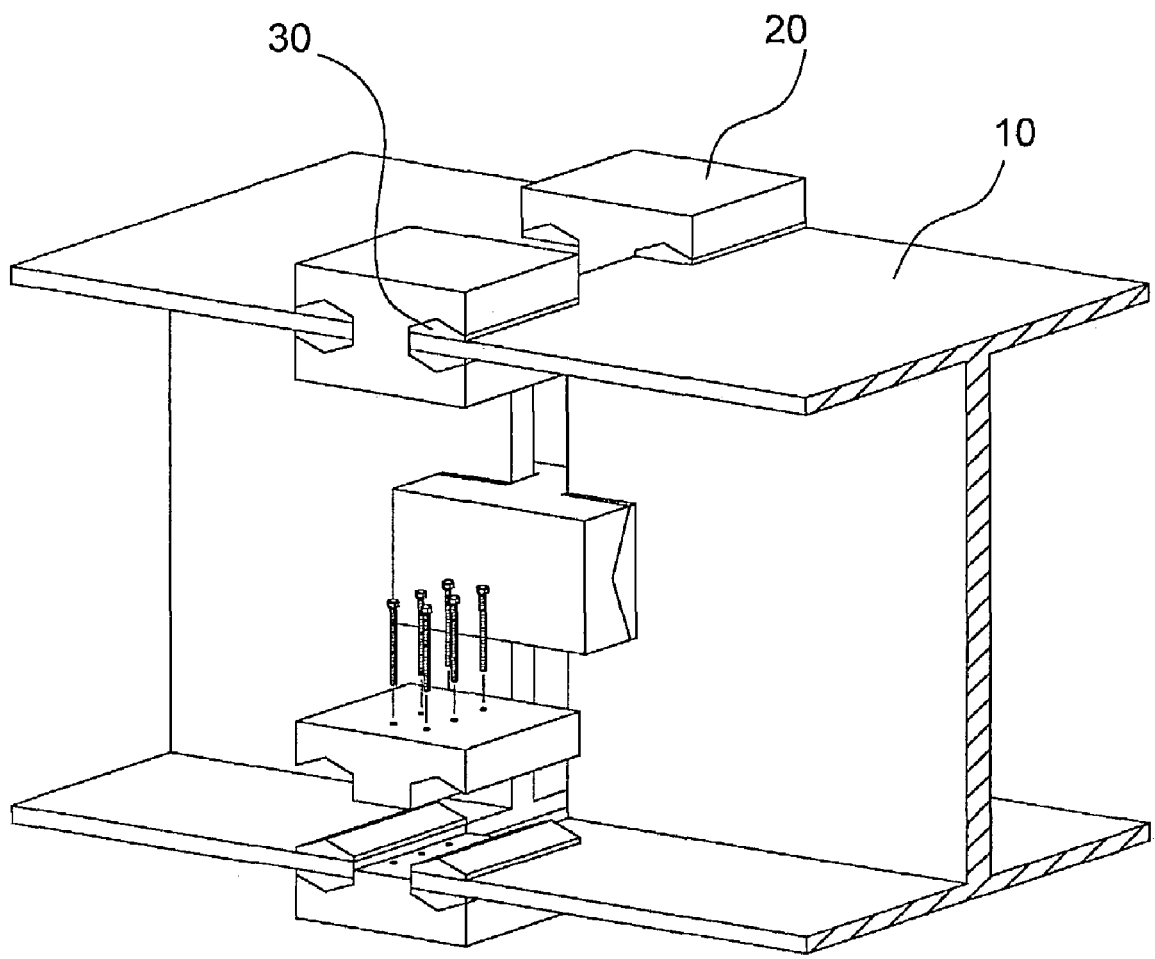
FIG. 13 represents the connection between two H-shaped members according to the present invention described in Preferred Embodiment 1.

FIG. 13 illustrates Preferred Embodiment 1 of the present invention. In this figure, coupling device of the present invention are used to connect two H-shaped members (10). The two coupling cases (20) to connect the top flange are the type of coupling device exhibited in FIG. 6, and the web is connected using the coupling device shown in FIG. 7, and the bottom flange is connected using the separate-type coupling device exhibited in FIG. 10. FIG. 13 shows that different types of coupling devices can be used for one joint depending on conditions, though it is not usual in construction field.

Figure 11A:
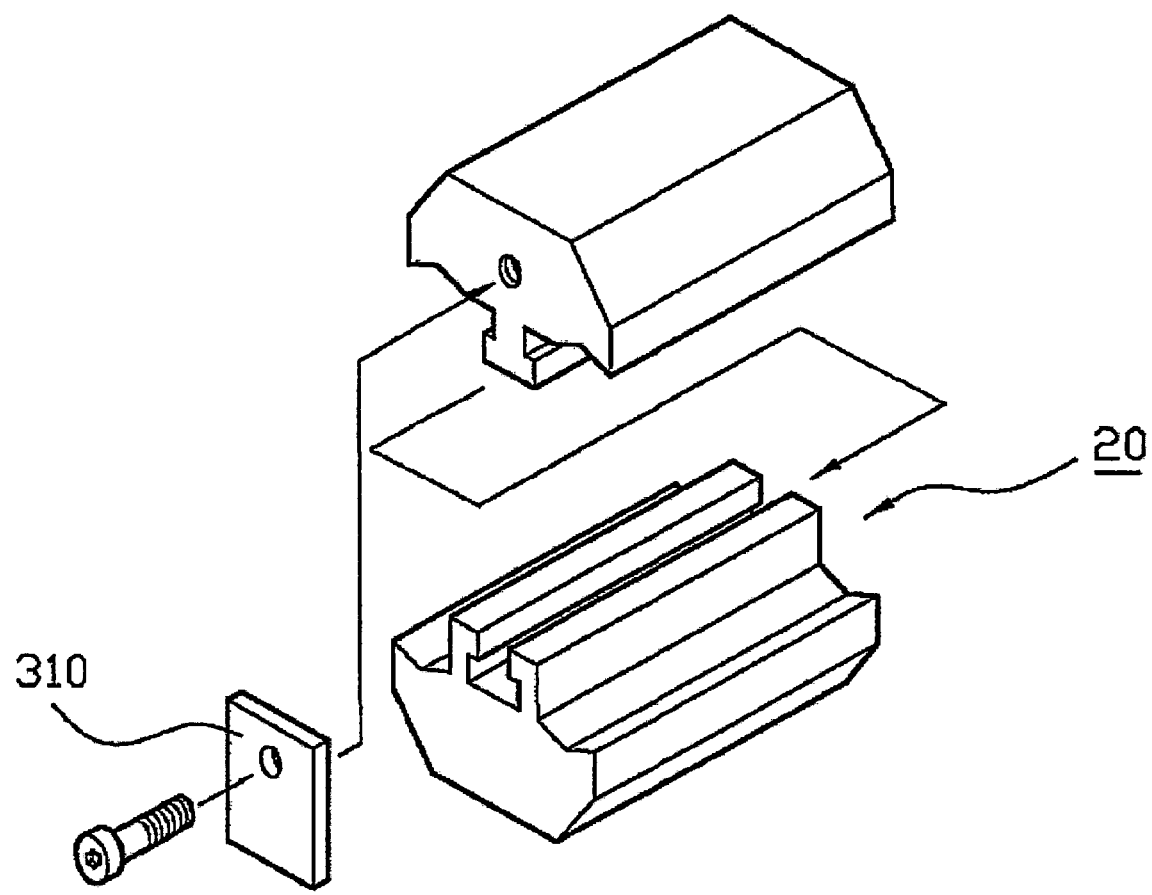
FIGS. 11A and 11B show the separate-type coupling case of the present invention using male and female pieces.
Figure 11B:
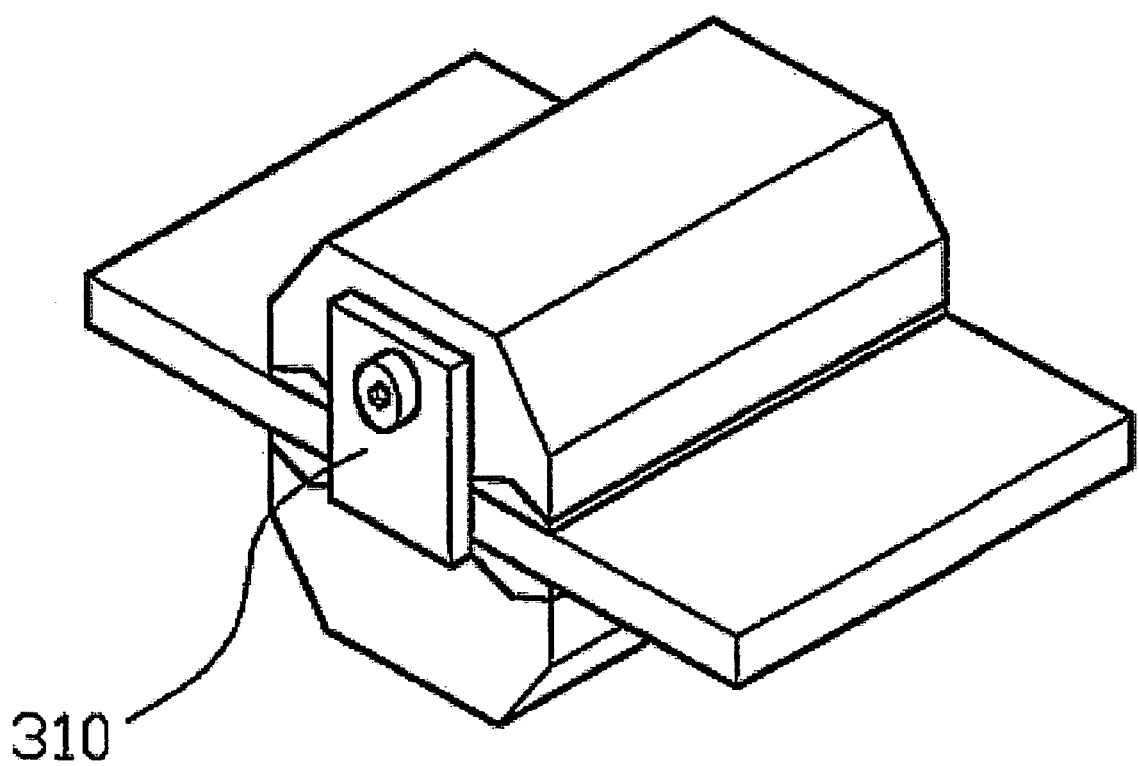
Figure 12:
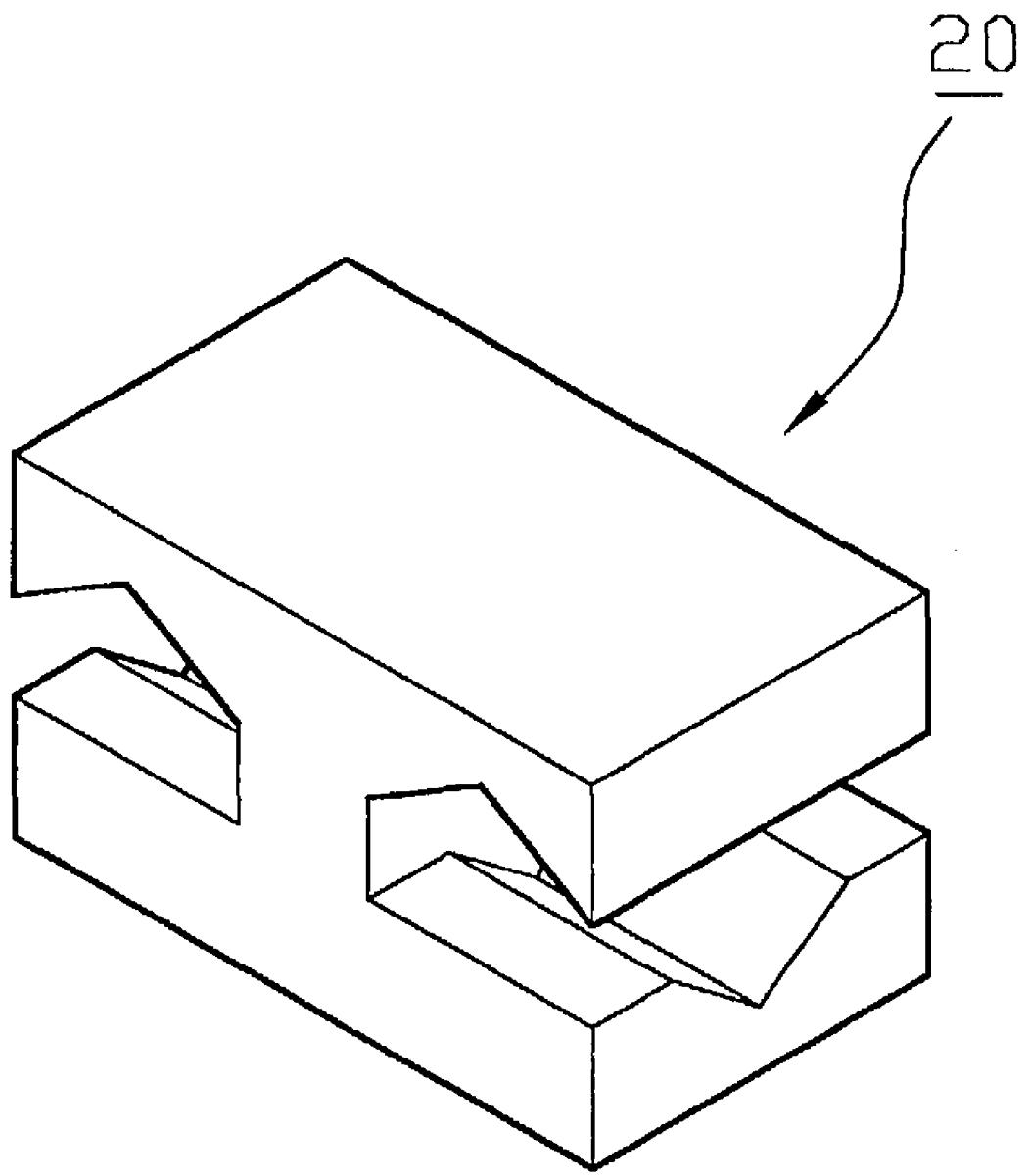
FIG. 12 shows the coupling case of the present invention for connecting members subjected to both axial and shear forces.

Other types of coupling cases (20) illustrated in FIG. 11 or FIG. 12 can be applied in FIG. 13.

<Preferred Embodiment 2>

Figure 14:
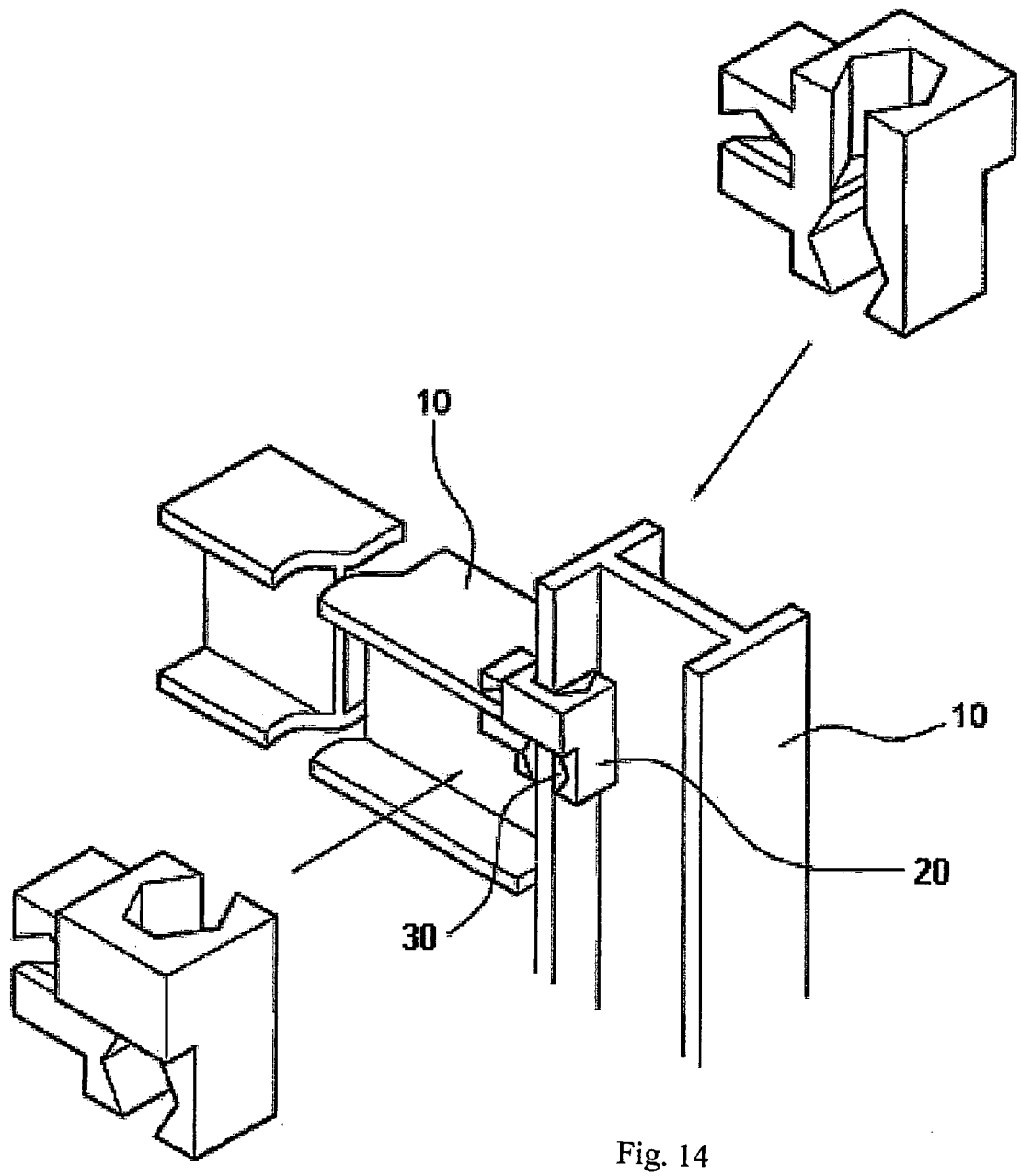
FIG. 14 represents the connection between two H-shaped members that meet at right angle according to the present invention described in Preferred Embodiment 2.

FIG. 14 illustrates Preferred Embodiment 2 of the present invention. The coupling device of the present invention connects two H-shaped members (10) that meet at right angle.

In this figure, the coupling case (20) has three connecting slots. Two connecting slots are used for one member (vertical member in the figure) to resist two external forces acting in two directions. One connecting slot is used for the other member (horizontal member in the figure) to resist external force in one direction.

<Preferred Embodiment 3>

Figure 15:
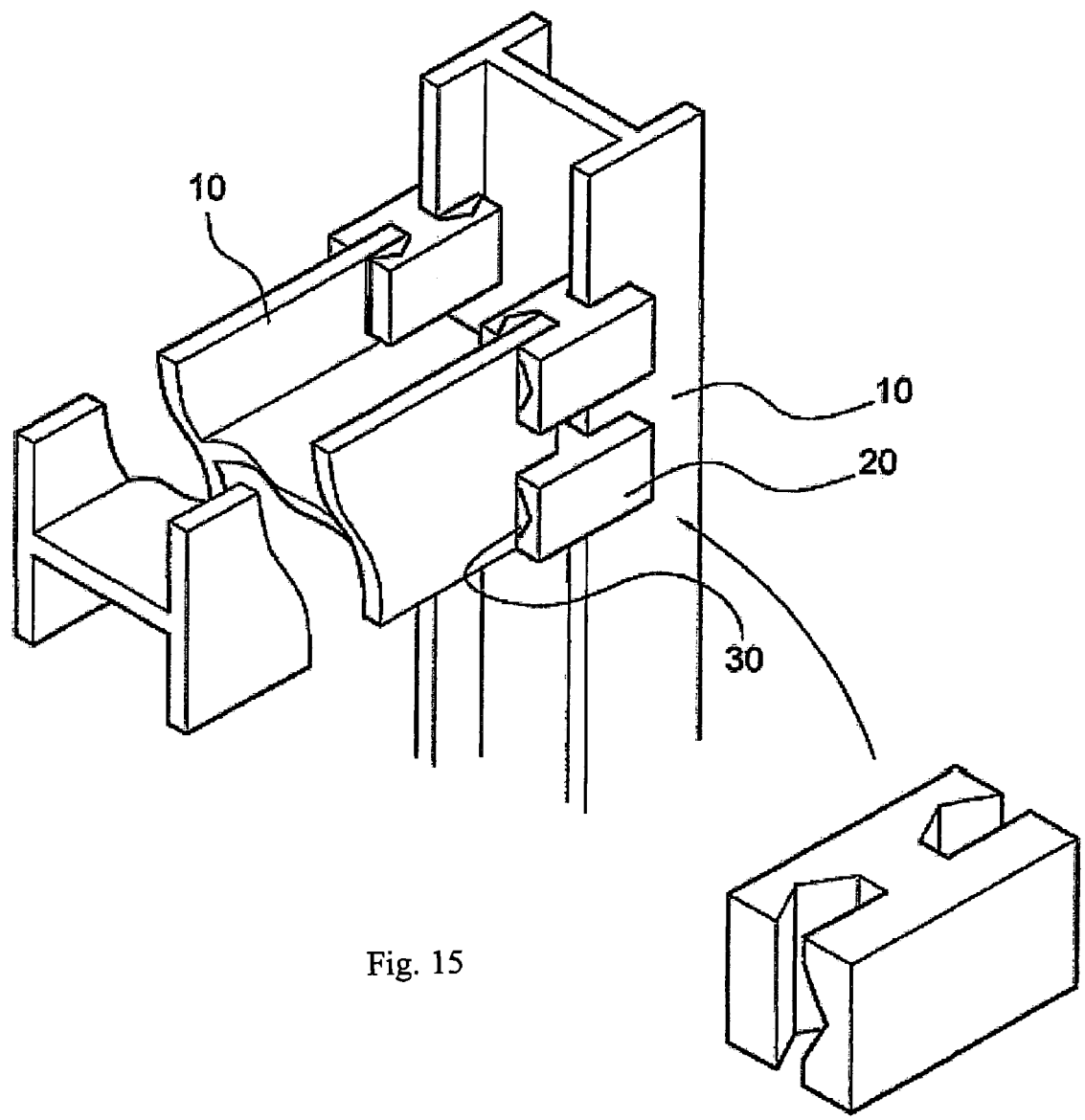
FIG. 15 represents the connection between two H-shaped members that meet at right angle according to the present invention described in Preferred Embodiment 3.

FIG. 15 illustrates Preferred Embodiment 3 of the present invention. Compared with Preferred Embodiment 2, one member (horizontal member in the figure) is rotated by 90° about its axis. Preferred Embodiment 3 employs the coupling case (20) exhibited in FIG. 12 to resist external forces in two directions.

<Preferred Embodiment 4>

Figure 16:
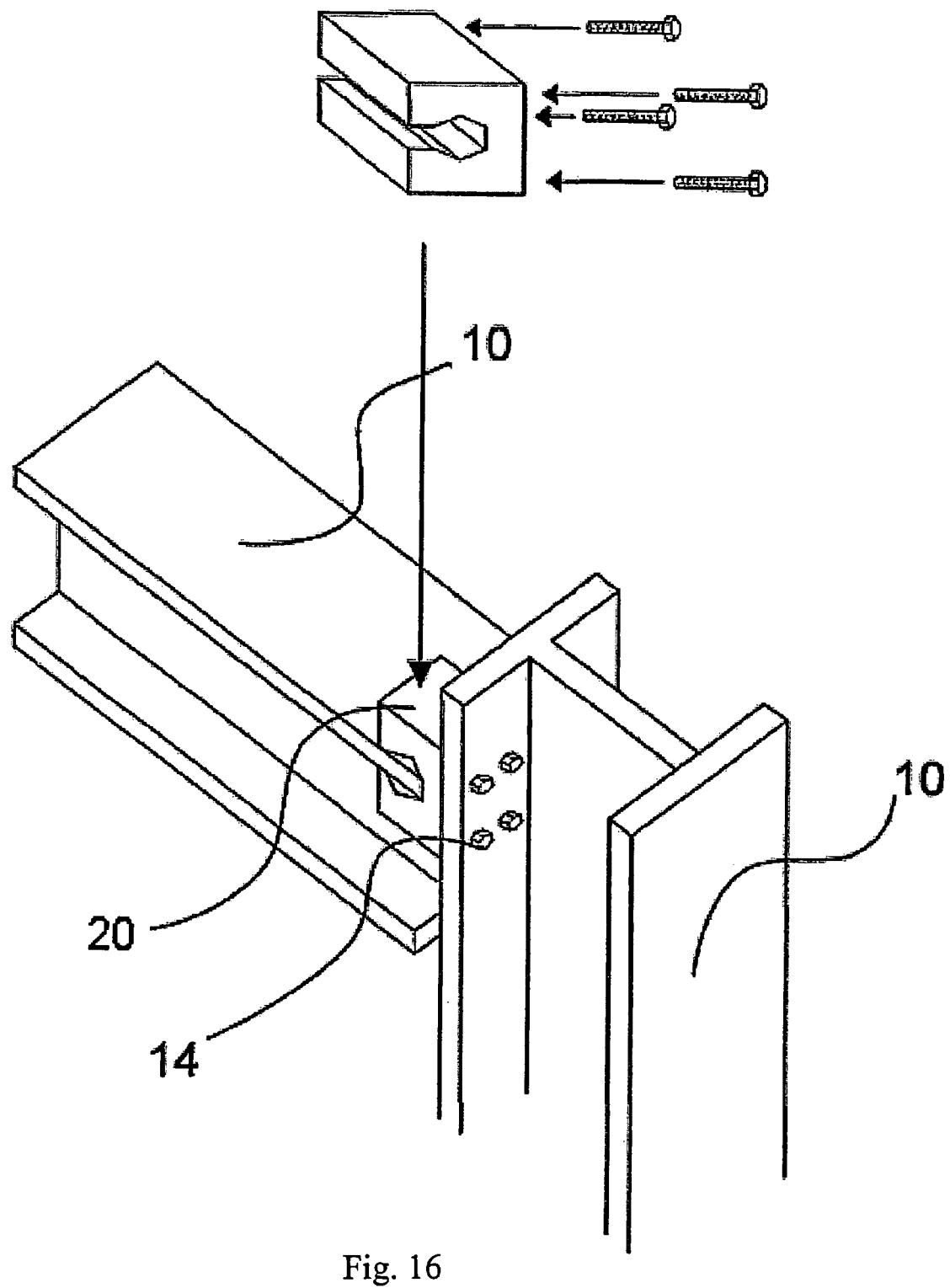
FIG. 16 represents the connection between two H-shaped members that meet at right angle according to the present invention described in Preferred Embodiment 4; and, FIG. 17 represents the connection between two H-shaped members of different sizes according to the present invention described in Preferred Embodiment 5.

FIG. 16 illustrates Preferred Embodiment 4 of the present invention. In this preferred embodiment, coupling case (20) of the present invention has a connecting slot on one side only. The other flat side is connected to a member using bolts.

<Preferred Embodiment 5>

Figure 17:
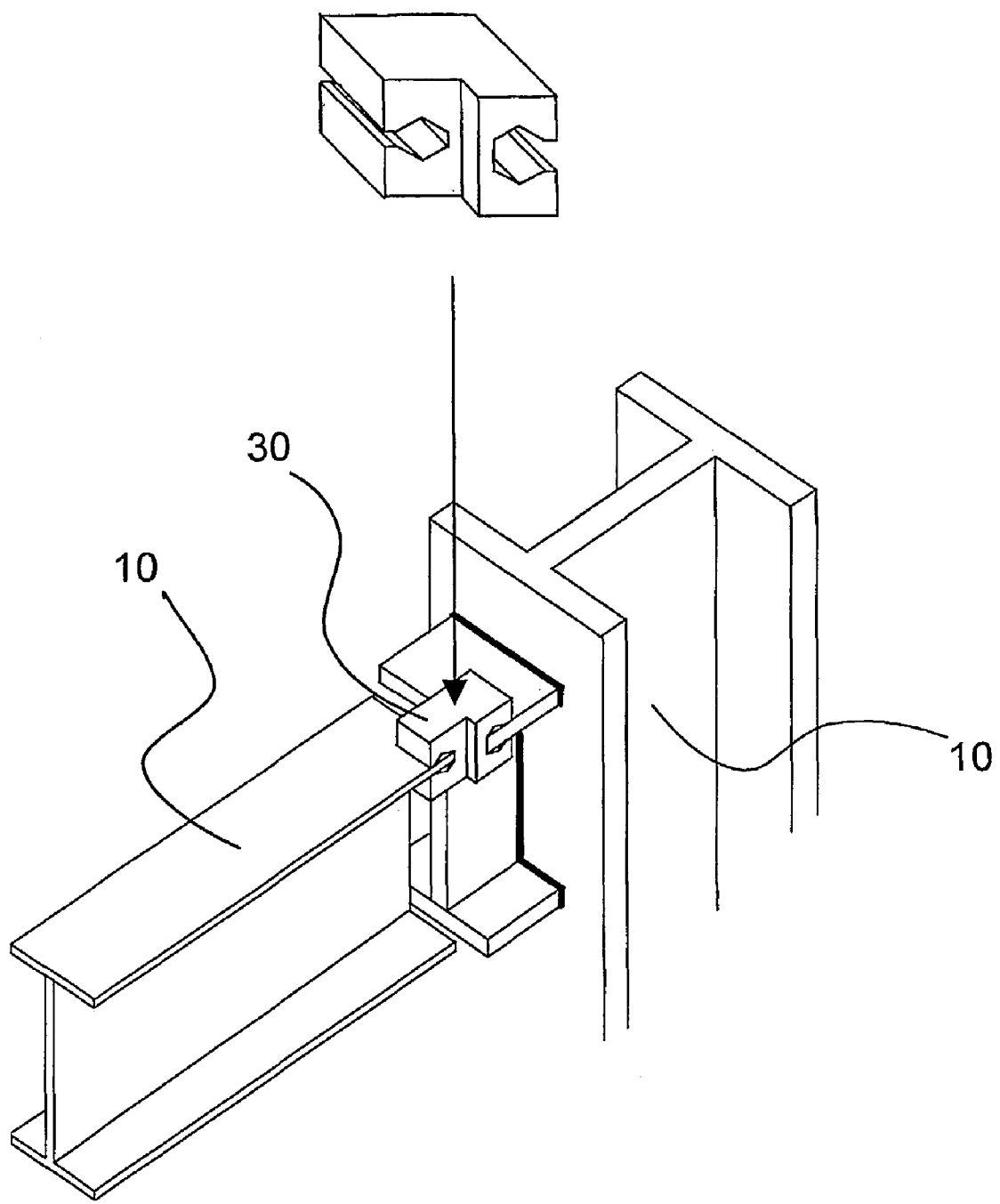

FIG. 17 illustrates Preferred Embodiment 5 of the present invention. The coupling device (20) of the present invention connects one member to another of larger size which is welded to a column member using the method of Preferred Embodiment 1.

As shown in the figure, the width and the thickness of two members are different. Two members of different sizes can be connected by adjusting the length and/or the height of the connecting slots. The coupling device of the present invention can be used to improve the seismic performance of structural frame during severe earthquake by moving the plastic hinge away from the beam-to-column welds.

INDUSTRIAL APPLICABILITY

The coupling device of the present invention can solve the problems of bolt connections such as a notch and stress concentration around the holes. Besides, the coupling device of the present invention can reduce the construction time and the labor costs greatly compared with friction-type bolt connection.

Those skilled in the art will appreciate that the conceptions and specific embodiments disclosed in the foregoing description may be readily utilized as a basis for modification or design of other embodiments to carry out the same purposes of the present invention. Those skilled in the art will also appreciate that such equivalent embodiments do not depart from the scope of the invention as set forth in the appended claims.

What is claimed is:

1. A coupling device for connecting members, comprising:
    a coupling case that has at least one connecting slot which respectively receives one of the members; and
    wedges that are inserted into the spaces between said coupling case and each of said received members perpendicularly to the direction of external pressure given to each of said members,
    wherein each of said wedges have one side and another side out of at least a couple of sloped sides contacting said coupling case in opposite directions and have a higher coefficient of friction on a bottom side surface that touches one of said members than on the sloped side surfaces that touch said coupling case,
    wherein the bottom surface of each said wedge has projections or serrations parallel or almost parallel to the axis of said wedge to increase the friction coefficient.

2. A coupling device for connecting members, comprising:
    a coupling case that has at least one connecting slot which respectively receives one of the members; and
    wedges that are inserted into the spaces between said coupling case and each of said received members perpendicularly to the direction of external pressure given to each of said members,
    wherein each of said wedges have one side and another side out of at least a couple of sloped sides contacting said coupling case in opposite directions and have a higher coefficient of friction on a bottom side surface that touches one of said members than on the sloped side surfaces that touch said coupling case,
    wherein said wedges conform to the space between said coupling case and said members and the cross sectional shape of each said wedge is selected among triangle, trapezoid, or pentagon, and
    wherein the bottom surface of each said wedge has projections or serrations parallel or almost parallel to the axis of said wedge to increase the friction coefficient.

3. A coupling device for connecting members, comprising:
    a coupling case that has at least one connecting slot which respectively receives one of the members; and
    wedges that are inserted into the spaces between said coupling case and each of said received members perpendicularly to the direction of external pressure given to each of said members,
    wherein each of said wedges have one side and another side out of at least a couple of sloped sides contacting said coupling case in opposite directions and have a higher coefficient of friction on a bottom side surface that touches one of said members than on the sloped side surfaces that touch said coupling case,
    wherein said wedges conform to the space between said coupling case and said members and the cross sectional shape of each said wedge is selected among triangle, trapezoid, or pentagon,
    wherein the wedge angle ($\theta$) between the sloped side and the bottom side of each said wedge is ranged from 1° to $$\left(\operatorname{atan}\frac{\mu' - \mu}{1 + \mu \cdot \mu'}\right),$$

wherein $\mu$ is a friction coefficient between said wedge and said coupling case; and $\mu'$ is a friction coefficient between said wedge and said member, and
    wherein the bottom surface of each said wedge has projections or serrations parallel or almost parallel to the axis of said wedge to increase the friction coefficient.

4. A coupling device for connecting members, comprising:
    a coupling case that has at least one connecting slot which respectively receives one of the members; and
    wedges that are inserted into the spaces between said coupling case and each of said received members perpendicularly to the direction of external pressure given to each of said members,
    wherein each of said wedges have one side and another side out of at least a couple of sloped sides contacting said coupling case in opposite directions and have a higher coefficient of friction on a bottom side surface that touches one of said members than on the sloped side surfaces that touch said coupling case, wherein said wedges conform to the space between said coupling case and said members and the cross sectional shape of each said wedge is selected among triangle, trapezoid, or pentagon, wherein the wedge angle (θ) between the sloped side and the bottom side of each said wedge is ranged from 1° to $$\left(\mathrm{atan}\frac{\mu'-\mu}{1+\mu\cdot\mu'}\right),$$

wherein $\mu$ is a friction coefficient between said wedge and said coupling case; and $\mu'$ is a friction coefficient between said wedge and said member, wherein each said wedge also has slope in its axial direction to help installation, and wherein the bottom surface of each said wedge has projections or serrations parallel or almost parallel to the axis of said wedge to increase the friction coefficient.

* * * * *